US008773043B2

(12) United States Patent
Masuda

(10) Patent No.: US 8,773,043 B2
(45) Date of Patent: Jul. 8, 2014

(54) INTEGRATED CIRCUIT FOR ILLUMINATION DEVICE, AND ILLUMINATION DEVICE

(75) Inventor: Ryohichi Masuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/821,073

(22) PCT Filed: Aug. 8, 2011

(86) PCT No.: PCT/JP2011/068074
§ 371 (c)(1),
(2), (4) Date: Mar. 6, 2013

(87) PCT Pub. No.: WO2012/039205
PCT Pub. Date: Mar. 29, 2012

(65) Prior Publication Data
US 2013/0162150 A1   Jun. 27, 2013

(30) Foreign Application Priority Data

Sep. 24, 2010   (JP) ................. 2010-214506

(51) Int. Cl.
*H05B 37/02* (2006.01)
(52) U.S. Cl.
USPC .............................. 315/294; 315/307; 315/312
(58) Field of Classification Search
USPC ............ 315/209 R, 224–226, 291, 294, 307, 315/308, 312
See application file for complete search history.

(56) References Cited

U.S. PATENT DOCUMENTS

| 7,919,936 B2 * | 4/2011 | Liu et al. ............... 315/307 |
| 2002/0105373 A1 | 8/2002 | Sudo |
| 2005/0093792 A1 | 5/2005 | Yamamoto et al. |
| 2009/0128055 A1 | 5/2009 | Shin et al. |
| 2010/0213858 A1 | 8/2010 | Kuroki et al. |

FOREIGN PATENT DOCUMENTS

| JP | 2002-319707 | 10/2002 |
| JP | 2005-136157 | 5/2005 |
| JP | 2006-301027 | 11/2006 |
| JP | 2009-9817 | 1/2009 |
| JP | 2009-124125 | 6/2009 |
| JP | 2010-170844 | 8/2010 |

OTHER PUBLICATIONS

International Search Report for PCT/JP2011/068074, mailed Oct. 25, 2011.
Non-English Written Opinion for PCT/JP2011/068074, mailed Oct. 25, 2011.

* cited by examiner

*Primary Examiner* — Jimmy Vu
(74) *Attorney, Agent, or Firm* — Nixon & Vanderhye, P.C.

(57) ABSTRACT

According to the present invention, anode-side ends of LED arrays (1011) and (1012) are connected to an identical point. A constant current circuit (1003) drives the LED array (1011) by a constant current, whereas, a constant current control circuit (3) drives the LED array (1012) by a constant current and by pulses.

7 Claims, 4 Drawing Sheets

INTEGRATED CIRCUIT FOR ILLUMINATION DEVICE, AND ILLUMINATION DEVICE

This application is the U.S. national phase of International Application No. PCT/JP2011/068074 filed 8 Aug. 2011 which designated the U.S. and claims priority to JP Patent Application No. 2010-214506 filed 24 Sep. 2010, the entire contents of each of which are hereby incorporated by reference.

TECHNICAL FIELD

The present invention relates to an integrated circuit for an illumination device and an illumination device, each of which is arranged such that (i) aggregate of a plurality of light-emitting elements such as LEDs (light-emitting diodes) constitutes a single light source and (ii) the light source is used as an illumination lamp whose brightness can be controlled to a desired brightness.

BACKGROUND ART

LEDs in recent years have experienced a rapid improvement in their performance, and white LEDs, which are essential for illumination, have been developed. Also in terms of brightness, LEDs have become capable of emitting light that is bright enough to be used for illumination lamps.

However, since forward voltages of LEDs, constituting an illumination lamp which is made up of aggregate of the LEDs, vary, driving currents of the LEDs vary. As a result, luminosities of the LEDs also vary. In addition, in a case where the luminosities of the LEDs vary, partial unevenness occurs in brightness on a light-emitting surface of the illumination lamp. This reduces quality of the illumination lamp.

In view of the circumstances, a configuration of a light-emitting diode lighting system (illumination device) has been conventionally known, in which configuration a constant current circuit is provided for each LED or for each series circuit constituted by a plurality of (approximately six) LEDs connected in series. The constant current circuit controls a current passing through its corresponding LED(s) to be constant, thereby reducing variations in luminosities of LEDs.

FIG. 4 is a circuit diagram showing an example of a circuit configuration of a conventional light-emitting diode lighting system.

In a lighting circuit 1001, a power source Vdd1 and a constant current circuit 1003, which are for turning on an LED array 1011 constituted by six LEDs 1 connected in series, are connected. Each of the LEDs 1 has a forward voltage drop (Vf) of 3.6 V (typ.: typical) and emits white light. The constant current circuit 1003 controls a transistor 1006 so that a current, which is determined by a voltage value of a reference voltage (Vref) and a resistance value of a resistor 1004, is stably supplied to the LED array connected to the constant current circuit 1003. Patent Literature 1 discloses how such a lighting circuit for LEDs operates. In this configuration, the LED array 1011 have a voltage drop of 21.6 V, which is the sum total of the Vfs of the LEDs 1. Therefore, the voltage value of the Vdd1 is set at 30 V in consideration of variations in the Vfs of the LEDs 1 and changes in power supply.

In a lighting circuit 1002, a power source Vdd2 and a constant current circuit 1003, which are for turning on an LED array 1012 constituted by six LEDs 2 connected in series, are connected. Each of the LEDs 2 has a forward voltage drop (Vf) of 2.1 V (typ.) and emits warm color light. In this configuration, the LED array 1012 has a voltage drop of 12.6 V, which is the sum total of the Vfs of the LEDs 2. Therefore, the voltage value of the Vdd2 is set at 20 V in consideration of variations in the Vfs of the LEDs 2 and changes in power supply.

However, the conventional circuit configuration as shown in FIG. 4 has the following problem. In order to turn on a plurality of LEDs which emit light of different colors and control the colors of the light, many power sources are necessary and this leads to cost increase.

Note, here, that it is possible to solve the problem of high costs by modifying the configuration such that anodes of the LED arrays 1011 and 1012 are connected to an identical point and the point is connected to a common power source.

However, in a case where the anodes are connected to an identical point, it is necessary that the power supply voltage of each of the power sources Vdd1 and Vdd2 be 30 V. In such a case, a voltage applied to the constant current circuit 1003 of the lighting circuit 1002 simply increases by 10 V. In view of this, for the purpose of preventing a current which passes through a resistor 1004 from changing, the constant current circuit 1003 changes an output voltage of an operational amplifier which serves as a comparator 1005 so as to change a gate voltage of a transistor 1006, thereby increasing on-resistance of the transistor 1006. As a result, more current is consumed by the transistor 1006, and more heat is generated. That is, according to the system in which the anodes of LEDs having different Vfs are connected to an identical point like above, a problem of power waste occurs. In addition, the above system also causes a problem that, since LEDs are heat-sensitive, it is necessary to take additional measures to dissipate generated heat to prevent deterioration caused by high temperature. The same applies to a case where cathodes are connected to an identical point.

Note that an example of the configuration of FIG. 4 is shown in FIG. 15 of Patent Literature 1.

In order to solve the above problem of heat generation, for example, Patent Literature 2 discloses a technique of preventing power from being wastefully consumed as heat due to the same voltage supplied to anodes, in a color-sequential LED driving circuit in which R, G and B LEDs are sequentially turned on. The color-sequential LED driving circuit disclosed in Patent Literature 2 solves the problem of heat generation by (i) providing, between a power source circuit and an anode of an LED, a circuit which allows output of an anode voltage suitable for an LED to be turned on and (ii) switching the circuit depending on which LED is to be turned on.

CITATION LIST

Patent Literature 1

Japanese Patent Application Publication, Tokukai, No. 2002-319707 A (Publication Date: Oct. 31, 2002)

Patent Literature 2

Japanese Patent Application Publication, Tokukai, No. 2006-301027 A (Publication Date: Nov. 2, 2006)

SUMMARY OF INVENTION

Technical Problem

However, in a case where a switching circuit as described in Patent Literature 2 is to be provided, a circuit whose power source is highly stable is required. This leads to cost increase.

Furthermore, in a case where a color of light of an LED lamp etc. is to be controlled, there is a possibility of being unable to carry out switching using a switching circuit, i.e., the switching circuit cannot be used.

The present invention has been made in view of the above problem, and an object of the present invention is to provide an integrated circuit for an illumination device and an illumination device, each of which is capable of reducing, at low cost, heat that would be generated when LEDs having different Vfs are turned on by supplying the same voltage to anodes of the LEDs.

Solution to Problem

In order to solve the above problem, an integrated circuit for an illumination device of the present invention is an integrated circuit for driving a group of light-emitting diodes, the group of the light-emitting diodes including at least (i) a first light-emitting diode system constituted by one light-emitting diode or by a plurality of light-emitting diodes connected in series and (ii) a second light-emitting diode system constituted by one light-emitting diode or by a plurality of light emitting diodes connected in series, an anode-side end of the first light-emitting diode system and an anode-side end of the second light-emitting diode system being connected to an identical point, and the one light-emitting diode or the plurality of light-emitting diodes, which constitute(s) the first light-emitting diode system, each having an emission wavelength different from that of each of the one light-emitting diode or the plurality of light-emitting diodes which constitute(s) the second light-emitting diode system, the integrated circuit, including: (i) a first constant current driving circuit for controlling a current which drives the first light-emitting diode system; and (ii) a second constant current driving circuit for controlling a current which drives the second light-emitting diode system, the first constant current driving circuit driving the first light-emitting diode system by a steady electric current, the second constant current driving circuit driving the second light-emitting diode system by an intermittent current and a regenerative current, the first constant current driving circuit being capable of (i) controlling brightness of the one light-emitting diode or the plurality of light-emitting diodes which constitute(s) the first light-emitting diode system which is to be driven, by controlling a period during which the one light-emitting diode or the plurality of light-emitting diodes which constitute(s) the first light-emitting diode system is/are ON, and the second constant current driving circuit being capable of (ii) controlling brightness of the one light-emitting diode or the plurality of light-emitting diodes which constitute(s) the second light-emitting diode system which is to be driven, by controlling a period during which the one light-emitting diode or the plurality of light-emitting diodes which constitute(s) the second light-emitting diode system is/are ON.

In order to solve the above problem, an illumination device of the present invention is an illumination device, including: (i) a first power supply line; (ii) a second power supply line; (iii) a first light-emitting diode system constituted by one light-emitting diode or by a plurality of light-emitting diodes connected in series; (iv) a second light-emitting diode system constituted by one light-emitting diode or by a plurality of light-emitting diodes connected in series; (v) an inductance which has a first terminal and a second terminal; (vi) a freewheel diode; (vii) a first constant current driving circuit for controlling a current which drives the first light-emitting diode system; and (viii) a second constant current driving circuit for controlling a current which drives the second light-emitting diode system, the first constant current driving circuit including (a) a first transistor which has a source, a drain and a gate, (b) a first resistor which has (i) a first terminal connected to the source of the first transistor and (ii) a second terminal connected to the second power supply line, and (c) a first amplifier (i) which receives, at its input terminals, a voltage value detected at the source of the first transistor and a first reference voltage and (ii) whose output terminal is connected to the gate of the first transistor, the second constant current driving circuit including (a) a second transistor which has a source, a drain and a gate, (b) a second resistor which has (i) a first terminal connected to the source of the second transistor and (ii) a second terminal connected to the second power supply line, (c) a second amplifier which (i) receives, at its input terminals, a voltage value detected at the source of the second transistor and a second reference voltage and (ii) whose output terminal is connected to the gate of the second transistor, and (d) a pulse wave generating circuit for generating a pulse which controls whether or not to cause the second amplifier to operate and supplying the pulse to the second amplifier, an anode-side end of the first light-emitting diode system, an anode-side end of the second light-emitting diode system, and a cathode of the freewheel diode being connected to the first power supply line, a cathode-side end of the first light-emitting diode system being connected to the drain of the first transistor, a cathode-side end of the second light-emitting diode system being connected to the first terminal of the inductance, the second terminal of the inductance being connected to the drain of the second transistor and an anode of the freewheel diode, the one light-emitting diode or the plurality of light-emitting diodes, which constitute(s) the first light-emitting diode system, each having an emission wavelength different from that of each of the one light-emitting diode or the plurality of light-emitting diodes which constitute(s) the second light-emitting diode system, the first amplifier, the second amplifier and the pulse wave generating circuit being provided on an integrated circuit, and the integrated circuit being capable of (i) controlling brightness of the one light-emitting diode or the plurality of light-emitting diodes which constitute(s) the first light-emitting diode system, by controlling a period during which the one light-emitting diode or the plurality of light-emitting diodes which constitute(s) the first light-emitting diode system is/are ON, and (ii) controlling brightness of the one-light emitting diode or the plurality of light-emitting diodes which constitute(s) the second light-emitting diode system, by controlling a period during which the one light-emitting diode or the plurality of light-emitting diodes which constitute(s) the second light-emitting diode system is/are ON.

According to the above configuration, the illumination device of the present invention includes a circuit (i) in which the anode-side ends of a plurality of light-emitting diode systems are connected to an identical point and (ii) which is capable of driving the plurality of light-emitting diode systems.

The above circuit includes two driving circuits for driving the light-emitting diode systems. One of the two driving circuits carries out a constant current driving of a light-emitting diode system, and the other of the two driving circuits carries out a constant current driving and a pulse driving of a light-emitting diode system.

According to the above configuration, when driving a plurality of light-emitting diode systems having different forward voltage drops (Vf) under the condition where anode-side ends of the plurality of light-emitting diode systems are connected to an identical point (i.e., the same power supply voltage is applied), it is possible to (i) drive a light-emitting diode system having a higher Vf by a direct current and (ii) drive a light-emitting diode system having a lower Vf by a constant current driving and a pulse driving. In the pulse driving, heat is not generated while the second transistor is open. Accordingly, the illumination device of the present invention is capable of reducing heat generation.

Furthermore, according to the above configuration, it is not necessary to highly stabilize a power source. This achieves cost reduction.

In particular, the integrated circuit for the illumination device of the present invention includes two driving circuits for driving light-emitting diode systems. One of the two driving circuits carries out a constant current driving of a light-emitting diode system, and the other of the two driving circuits carries out a constant current driving and a pulse driving of a light-emitting diode system.

As such, according to the above configuration, by applying an integrated circuit for an illumination device of the present invention to an illumination device which includes a plurality of light-emitting diode systems, it is possible to realize an illumination device capable of reducing heat generation at low cost.

Advantageous Effects of Invention

As has been described, an integrated circuit for an illumination device in accordance with the present invention is an integrated circuit for driving a group of light-emitting diodes, the group of the light-emitting diodes including at least (i) a first light-emitting diode system constituted by one light-emitting diode or by a plurality of light-emitting diodes connected in series and (ii) a second light-emitting diode system constituted by one light-emitting diode or by a plurality of light emitting diodes connected in series, an anode-side end of the first light-emitting diode system and an anode-side end of the second light-emitting diode system being connected to an identical point, and the one light-emitting diode or the plurality of light-emitting diodes, which constitute(s) the first light-emitting diode system, each having an emission wavelength different from that of each of the one light-emitting diode or the plurality of light-emitting diodes which constitute(s) the second light-emitting diode system, the integrated circuit, including: (i) a first constant current driving circuit for controlling a current which drives the first light-emitting diode system; and (ii) a second constant current driving circuit for controlling a current which drives the second light-emitting diode system, the first constant current driving circuit driving the first light-emitting diode system by a steady electric current, the second constant current driving circuit driving the second light-emitting diode system by an intermittent current and a regenerative current, the first constant current driving circuit being capable of (i) controlling brightness of the one light-emitting diode or the plurality of light-emitting diodes which constitute(s) the first light-emitting diode system which is to be driven, by controlling a period during which the one light-emitting diode or the plurality of light-emitting diodes which constitute(s) the first light-emitting diode system is/are ON, and the second constant current driving circuit being capable of (ii) controlling brightness of the one light-emitting diode or the plurality of light-emitting diodes which constitute(s) the second light-emitting diode system which is to be driven, by controlling a period during which the one light-emitting diode or the plurality of light-emitting diodes which constitute(s) the second light-emitting diode system is/are ON.

Furthermore, an illumination device in accordance with the present invention is an illumination device, including: (i) a first power supply line; (ii) a second power supply line; (iii) a first light-emitting diode system constituted by one light-emitting diode or by a plurality of light-emitting diodes connected in series; (iv) a second light-emitting diode system constituted by one light-emitting diode or by a plurality of light-emitting diodes connected in series; (v) an inductance which has a first terminal and a second terminal; (vi) a freewheel diode; (vii) a first constant current driving circuit for controlling a current which drives the first light-emitting diode system; and (viii) a second constant current driving circuit for controlling a current which drives the second light-emitting diode system, the first constant current driving circuit including (a) a first transistor which has a source, a drain and a gate, (b) a first resistor which has (i) a first terminal connected to the source of the first transistor and (ii) a second terminal connected to the second power supply line, and (c) a first amplifier (i) which receives, at its input terminals, a voltage value detected at the source of the first transistor and a first reference voltage and (ii) whose output terminal is connected to the gate of the first transistor, the second constant current driving circuit including (a) a second transistor which has a source, a drain and a gate, (b) a second resistor which has (i) a first terminal connected to the source of the second transistor and (ii) a second terminal connected to the second power supply line, (c) a second amplifier which (i) receives, at its input terminals, a voltage value detected at the source of the second transistor and a second reference voltage and (ii) whose output terminal is connected to the gate of the second transistor, and (d) a pulse wave generating circuit for generating a pulse which controls whether or not to cause the second amplifier to operate and supplying the pulse to the second amplifier, an anode-side end of the first light-emitting diode system, an anode-side end of the second light-emitting diode system, and a cathode of the freewheel diode being connected to the first power supply line, a cathode-side end of the first light-emitting diode system being connected to the drain of the first transistor, a cathode-side end of the second light-emitting diode system being connected to the first terminal of the inductance, the second terminal of the inductance being connected to the drain of the second transistor and an anode of the freewheel diode, the one light-emitting diode or the plurality of light-emitting diodes, which constitute(s) the first light-emitting diode system, each having an emission wavelength different from that of each of the one light-emitting diode or the plurality of light-emitting diodes which constitute(s) the second light-emitting diode system, the first amplifier, the second amplifier and the pulse wave generating circuit being provided on an integrated circuit, and the integrated circuit being capable of (i) controlling brightness of the one light-emitting diode or the plurality of light-emitting diodes which constitute(s) the first light-emitting diode system, by controlling a period during which the one light-emitting diode or the plurality of light-emitting diodes which constitute(s) the first light-emitting diode system is/are ON, and (ii) controlling brightness of the one-light emitting diode or the plurality of light-emitting diodes which constitute(s) the second light-emitting diode system, by controlling a period during which the one light-emitting diode or the plurality of light-emitting diodes which constitute(s) the second light-emitting diode system is/are ON.

Accordingly, the present invention makes it possible to reduce, at low cost, heat generation which would occur when LEDs having different Vfs are turned on by applying the same voltage to anodes of the LEDs.

DESCRIPTION OF EMBODIMENTS

Figure 4:
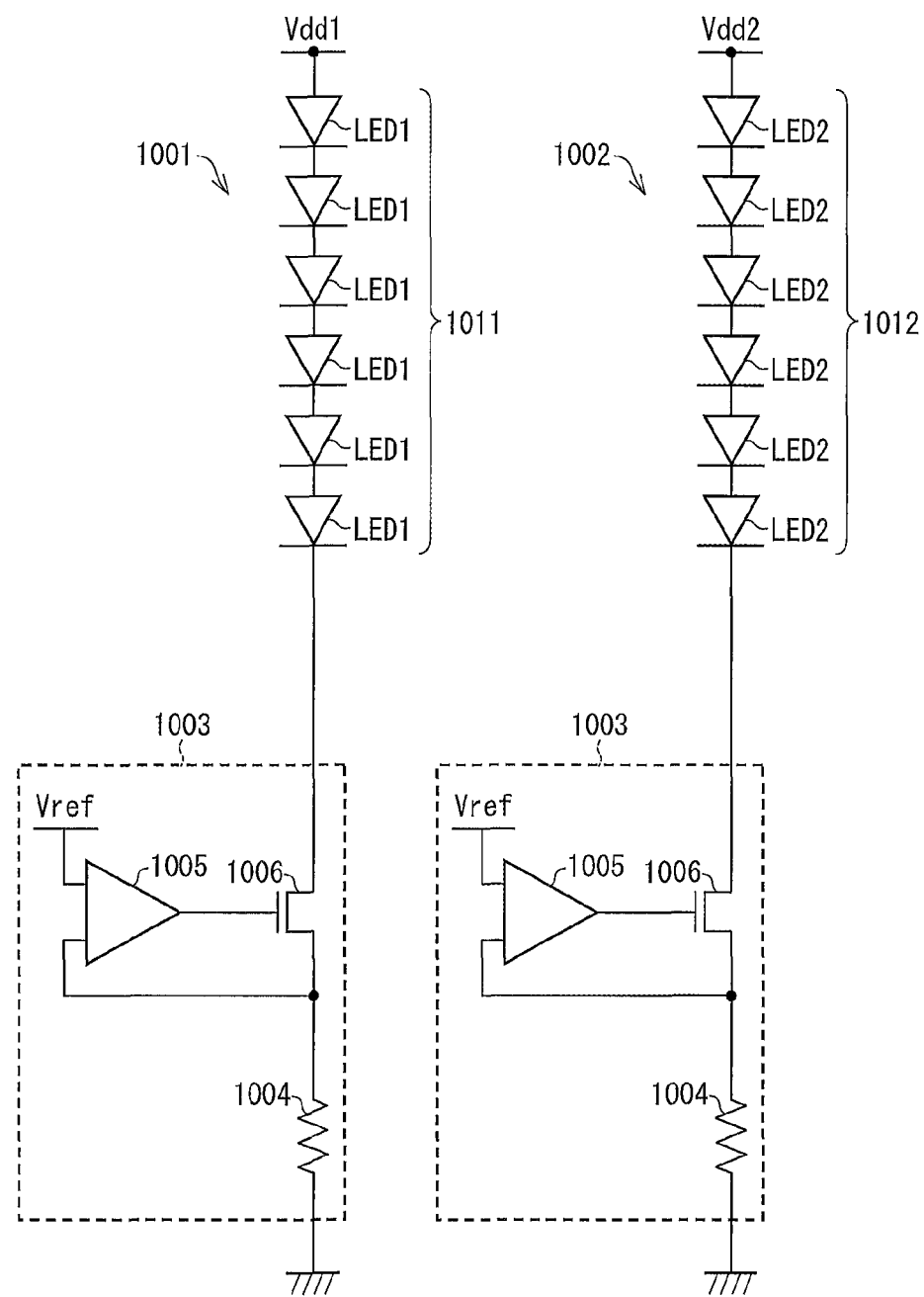
FIG. 4 is a circuit diagram showing a configuration of an illumination device in accordance with a conventional art.

In the description below, for convenience of description, members having functions identical to those constituting a light-emitting diode lighting system (illumination device) shown in FIG. 4 are assigned identical reference numerals, and their description may be omitted here.

Embodiment 1

Figure 1:
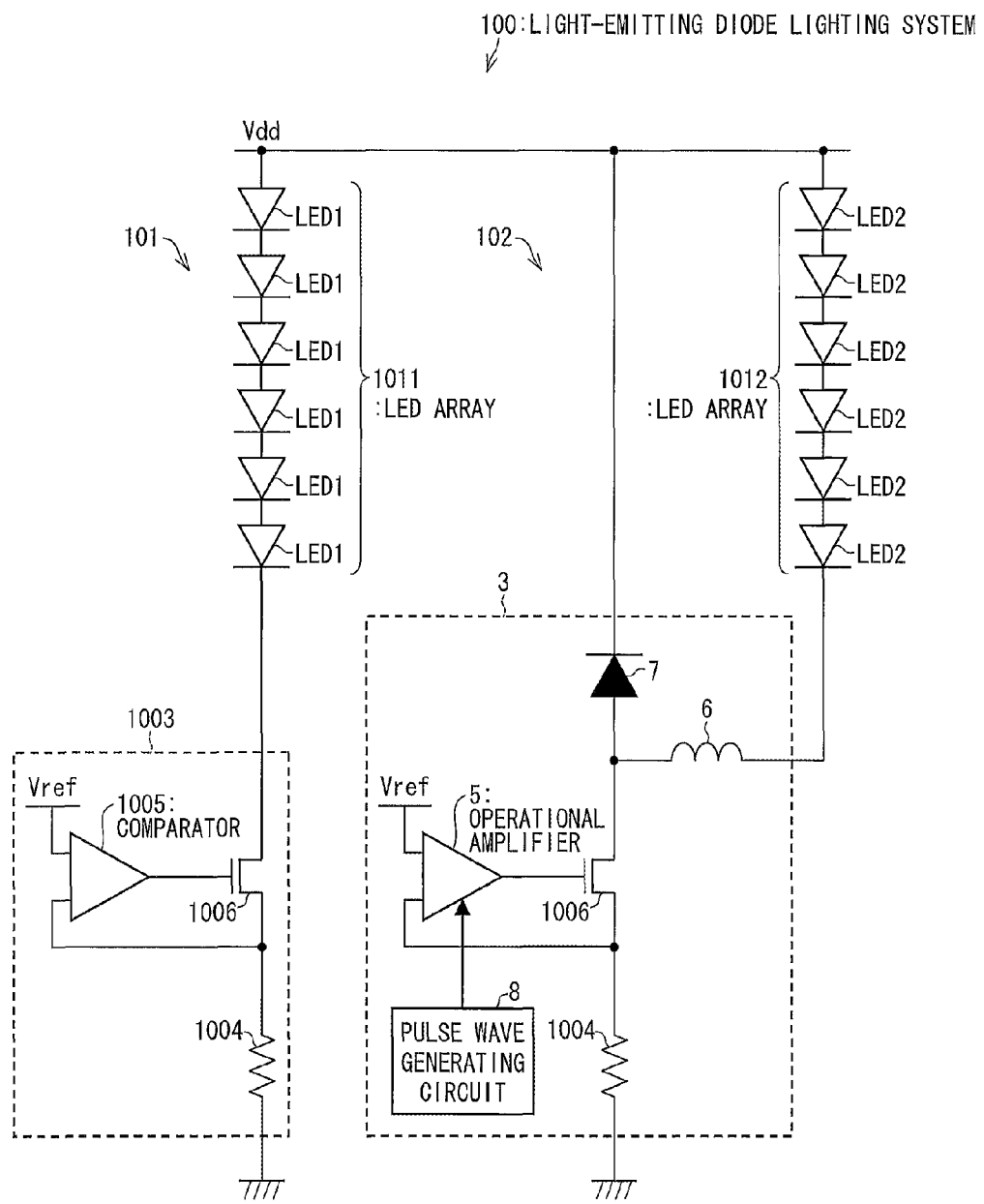
FIG. 1 is a circuit diagram showing a configuration of an illumination device in accordance with an embodiment of the present invention.

FIG. 1 is a circuit diagram showing a configuration of a light-emitting diode lighting system (illumination device) 100 in accordance with an embodiment of the present invention.

The light-emitting diode lighting system 100 includes a lighting circuit 101 and a lighting circuit 102.

The lighting circuit 101 includes (i) an LED array (first light-emitting diode system) 1011 constituted by six LEDs 1 connected in series and (ii) a constant current circuit (first constant current driving circuit) 1003. The lighting circuit 102 includes (a) an LED array (second light-emitting diode system) 1012 constituted by six LEDs 2 connected in series and (b) a constant current control circuit (second constant current driving circuit) 3.

Note, here, that each of the LED arrays is configured such that an anode of one of two adjacent LEDs is connected with a cathode of the other of the two adjacent LEDs. Accordingly, one end of each of the LED arrays corresponds to an anode of an LED whose cathode only is connected to another LED. Such an end is hereinafter referred to as an "anode-side end". Similarly, the other end of each of the LED arrays corresponds to a cathode of an LED whose anode only is connected to another LED. Such an end is hereinafter referred to as a "cathode-side end".

As is the case with the light-emitting diode lighting system shown in FIG. 4, each of the LEDs 1 for example has a forward voltage drop (Vf) of 3.6 V (typ.) and emits white light. Each of the LEDs 2 for example has a forward voltage drop (Vf) of 2.1 V (typ.) and emits warm color light.

The anode-side end of the LED array 1011 is connected to a power source (first power supply line) Vdd. Similarly, the anode-side end of the LED array 1012 is also connected to the power source Vdd. In other words, anode-side ends of the LED arrays 1011 and 1012 are connected to an identical point, which receives a power supply voltage (for example, 30 V) from the power source Vdd which is used in common.

The cathode-side end of the LED array 1011 is connected to the constant current circuit 1003.

The constant current circuit 1003 includes a resistor (first resistor) 1004, a comparator (first amplifier) 1005, and a transistor (first transistor) 1006. Note, here, that each transistor 1006 is an re-channel power MOSFET (Metal Oxide Semiconductor Field Effect Transistor), and has a source (first terminal), a drain (second terminal) and a gate (third terminal). Specifically, the cathode-side end of the LED array 1011 is connected to the drain of the transistor 1006.

The source of the transistor 1006 is connected to one end (first terminal) of the resistor 1004 (the first transistor and the first resistor constitute a series circuit). The other end (second terminal) of the resistor 1004 is connected to a second power supply line, which has an electric potential lower than that of the power source Vdd. Note that, in the present embodiment, the other end of the resistor 1004 is grounded, thereby the other end of the resistor 1004 is connected to the second power supply line.

The source of the transistor 1006 is further connected to one input terminal of the comparator 1005. The other input terminal of the comparator 1005 is connected to a power supply line which generates a reference voltage (Vref). An output terminal of the comparator 1005 is connected to the gate of the transistor 1006.

The constant current circuit 1003 controls, in the same manner as that shown in FIG. 4, the transistor 1006 so that a current, which is determined by a voltage value of the reference voltage (Vref) and a resistance value of the resistor 1004, stably passes through the LED array 1011.

The cathode-side end of the LED array 1012 is connected to a constant current control circuit 3.

The constant current control circuit 3 includes a resistor (second resistor) 1004, a transistor (second transistor) 1006, an operational amplifier (second amplifier) 5, a coil (inductance) 6, a diode (freewheel diode) 7 and a pulse wave generating circuit 8. Specifically, the cathode-side end of the LED array 1012 is connected to one end (first terminal) of the coil 6.

The other end (second terminal) of the coil 6 is connected to a drain of the transistor 1006, which is an n-channel power MOSFET, and to an anode of the diode 7. A cathode of the diode 7 is connected to the power source Vdd.

The constant current control circuit 3 is configured such that, similarly to the configuration of the constant current circuit 1003, (i) a source of the transistor 1006 is connected to one end (first terminal) of the resistor 1004 (the second transistor and the second resistor constitute a series circuit) and (ii) the other end (second terminal) of the resistor 1004 is connected to the second power supply line (here, the other end is grounded).

The source of the transistor 1006 is further connected to one input terminal of the operational amplifier 5. The other input terminal of the operational amplifier 5 is connected to a power supply line which generates a reference voltage (Vref). An output terminal of the operational amplifier 5 is connected to a gate of the transistor 1006.

The operational amplifier 5 is further connected with the pulse wave generating circuit 8. The pulse wave generating circuit 8 generates pulses for switching between operating and stopped states of the operational amplifier 5, and supplies the pulses to the operational amplifier 5. The operational amplifier 5 is for example configured to (i) operate upon receiving a high-level pulse from the pulse wave generating circuit 8 and (ii) upon receiving a low-level pulse from the pulse wave generating circuit 8, stop operating by turning off the transistor 1006 while receiving the low-level pulse. While in its operating state, the operational amplifier 5 operates in the same manner as the foregoing comparator 1005. A combination of the operational amplifier 5 and the pulse wave generating circuit 8 is for example a well-known chopping PWM (pulse width modulation) generating circuit.

The constant current control circuit 3 is a circuit which has, in addition to the same function as the constant current circuit 1003, a function of time-division driving in accordance with a frequency of pulses generated by the pulse wave generating circuit 8 (i.e., the operational amplifier 5 is switched between its operating and stopped states in accordance with logic of this pulse). That is, the constant current control circuit 3 is configured such that (i) the operational amplifier 5 outputs a pulse signal in accordance with the pulses generated by the pulse wave generating circuit 8 and (ii) on the basis of the pulse signal, opening/closing (ON/OFF) of the transistor 1006 is controlled.

In a case where a voltage value of the power source Vdd is set at 30 V, the lighting circuit 101 is in the same state as when the lighting circuit 1001 (shown in FIG. 4) receives a power supply voltage from the power source Vdd1. Therefore, a problem of heat generation does not occur. On the other hand, in this case, a constant current generating circuit in the lighting circuit 102 receives too high a voltage (20 V). Therefore, in a case where the constant current circuit 1003 is used as the constant current generating circuit, a problem of heat generation occurs.

In view of the circumstances, according to the light-emitting diode lighting system 100, the pulse wave generating circuit 8 supplies pulses to the operational amplifier 5. Then, in accordance with the pulses, the operational amplifier 5 controls the opening/closing of the transistor 1006 by a pulse signal so as to cause the transistor 1006 to be open for a period of time.

While the transistor 1006 of the constant current control circuit 3 is open, no constant current passes through the constant current control circuit 3. During this period in which no constant current passes, heat is not generated. This makes it possible for the light-emitting diode lighting system 100 as a whole to prevent an increase in temperature caused by heat generation.

Furthermore, the lighting circuit 102 includes the coil 6 and the diode 7. The coil 6 stores energy while the transistor 1006 of the constant current control circuit 3 is operating and releases the energy while the transistor 1006 is open, thereby generating a regenerative current. The regenerative current is supplied to the LED array 1012 and drives the LED array 1012.

According to the lighting circuit 102, even in a case where the transistor 1006 is open, it is possible to turn on the LEDs 2 by the energy stored in the coil 6. Therefore, it is possible to turn on LEDs 2 without blinking.

Note, here, that the energy to be stored in the coil 6 corresponds to electric power that would be uselessly consumed due to a restriction on electric currents in the conventional light-emitting diode lighting system shown in FIG. 4. On the other hand, the light-emitting diode lighting system 100 uses such electric power, which has conventionally been uselessly consumed, to drive the LED array 1012. This makes it possible to realize the lighting circuit 102 which consumes less electric power and generates less heat.

Note that, it is necessary to set one cycle of a period during which the constant current control circuit 3 is operated and a period during which the constant current control circuit 3 is not operated, i.e., one cycle of pulses generated by the pulse wave generating circuit 8, shorter than a period during which each of the LEDs 2 is turned on in response to the regenerative current generated by the coil 6. In the light-emitting diode lighting system 100, the pulses generated by the pulse wave generating circuit 8 have a frequency which falls within a range from 150 kHz to 300 kHz.

The constant current circuit 1003 and the constant current control circuit 3 can be realized on a single integrated circuit. In such a case, the integrated circuit has four terminals (from first to forth terminals) arranged as below.

The first terminal is provided between the gate of the transistor 1006 of the constant current circuit 1003 and the output terminal of the comparator 1005 of the constant current circuit 1003.

The second terminal is provided between the source of the transistor 1006 of the constant current circuit 1003 and one of the input terminals of the comparator 1005 of the constant current circuit 1003.

The third terminal is provided between the gate of the transistor 1006 of the constant current control circuit 3 and the output terminal of the operational amplifier 5 of the constant current control circuit 3.

The fourth terminal is provided between the source of the transistor 1006 of the constant current control circuit 3 and one of the input terminals of the operational amplifier 5 of the constant current control circuit 3.

The above integrated circuit is described later in details in Embodiment 3.

Note that, in the present embodiment, a first light-emitting diode system is the LED array 1011 which is constituted by the six LEDs 1 connected in series. However, the number of LEDs 1 in the first light-emitting diode system is not limited to six, and can be any number provided that the number is not less than one (the same is true with the following embodiments).

Similarly, in the present embodiment, a second light-emitting diode system is the LED array 1012 which is constituted by the six LEDs 2 connected in series. However, the number of LEDs 2 in the second light-emitting diode system is not limited to six, and can be any number provided the number is not less than one (the same is true with the following embodiments).

It is needless to say that, in a case where a light-emitting diode system is constituted by one LED, the anode-side end of the light-emitting diode system is the anode of the LED and the cathode-side end of the light-emitting diode system is the cathode of the LED.

Note that, in the present embodiment and the following embodiments, each transistor 1006 can be a p-channel power MOSFET, a bipolar transistor or the like instead of the n-channel power MOSFET.

Furthermore, in the present embodiment and the following embodiments, the transistor 1006 can be provided between its corresponding resistor 1004 (which is in the same block as the transistor 1006) and the second power supply line.

Furthermore, in the present embodiment and the following embodiments, where to provide the coil 6 is not limited provided that the coil 6, the power source Vdd, the diode 7 and the LED array 1012 form a loop. Therefore, instead of the connection shown in the drawings, the coil 6 can be connected for example between the power source Vdd and the LED array 1012.

Embodiment 2

Figure 2:
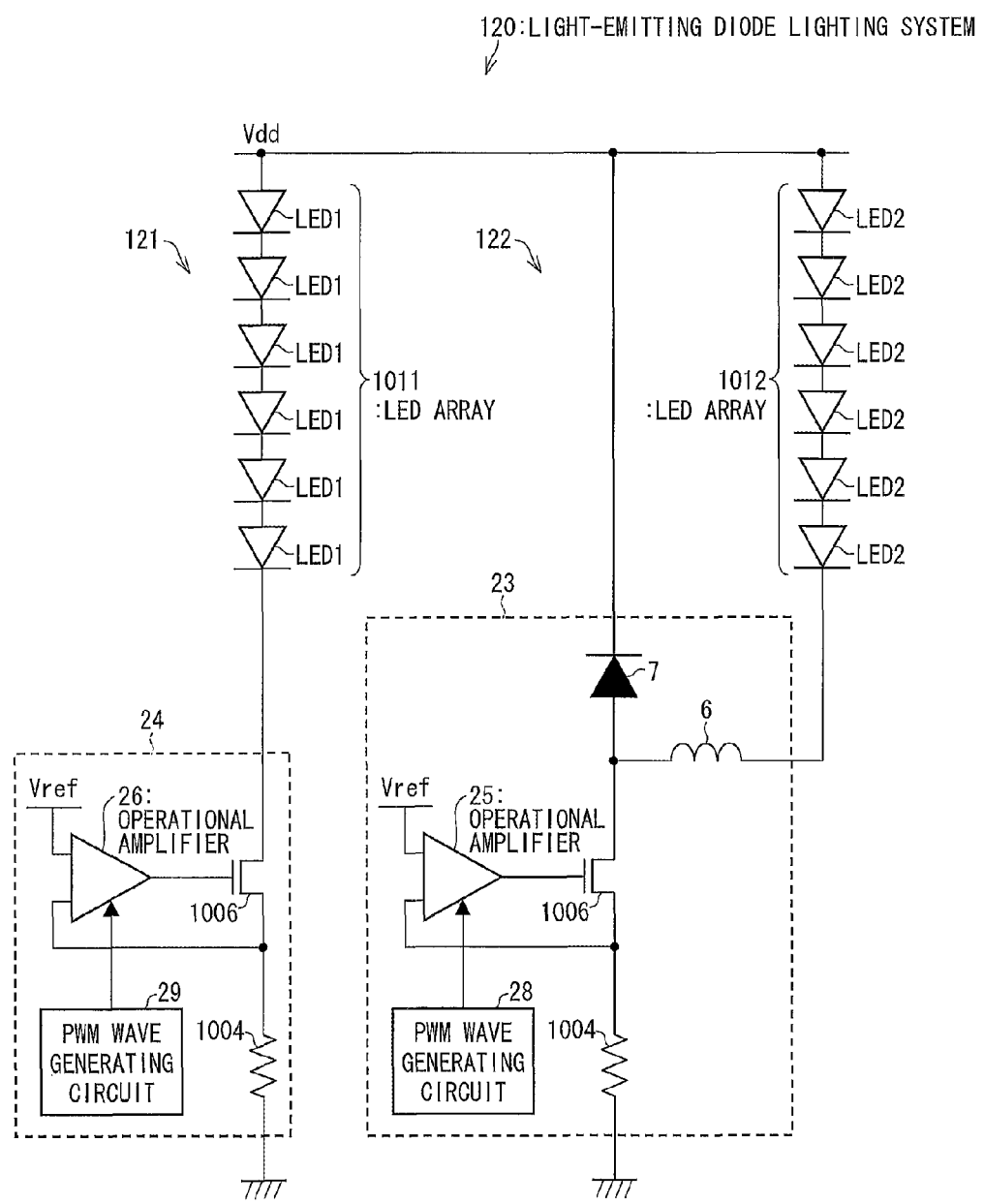
FIG. 2 is a circuit diagram showing a configuration of an illumination device in accordance with another embodiment of the present invention.

FIG. 2 is a circuit diagram showing a configuration of a light-emitting diode lighting system (illumination device) 120 in accordance with the present embodiment.

The light-emitting diode lighting system 120 is different from the light-emitting diode lighting system 100 (see FIG. 1) in the following points.

The light-emitting diode lighting system 120 includes lighting circuits 121 and 122, instead of the lighting circuits 101 and 102 of the light-emitting diode lighting system 100.

The lighting circuit 121 includes a constant current circuit 24 instead of the constant current circuit 1003 of the lighting circuit 101. The lighting circuit 122 includes a constant current control circuit 23 instead of the constant current control circuit 3 of the lighting circuit 102.

The constant current circuit 24 is different from the constant current circuit 1003 in that the constant current circuit 24 includes an operational amplifier 26 and a PWM wave generating circuit 29 instead of the comparator 1005. The operational amplifier 26 has one input terminal connected to a source of a transistor 1006, the other input terminal connected to a power supply line which generates a reference voltage (Vref), and an output terminal connected to a gate of the transistor 1006. Furthermore, the PWM wave generating circuit 29 is connected to the operational amplifier 26.

The constant current control circuit 23 is different from the constant current control circuit 3 in that the constant current control circuit 23 includes an operational amplifier 25 and a PWM wave generating circuit (pulse wave generating circuit) 28 instead of the operational amplifier 5 and the pulse wave generating circuit 8. The operational amplifier 25 has one input terminal connected to a source of a transistor 1006, the other input terminal connected to a power supply line which generates a reference voltage (Vref), and an output terminal connected to a gate of the transistor 1006. Furthermore, the PWM wave generating circuit 28 is connected to the operational amplifier 25.

The PWM wave generating circuits 28 and 29 generate pulses that have been subjected to pulse width modulation (such pulses are hereinafter referred to as a PWM signal), and supply PWM signals to the operational amplifiers 25 and 26, respectively. In accordance with logic of a supplied PWM signal, each of the operational amplifiers 25 and 26 is switched between its operating state (for example, in a case where the PWM signal is at high level) and its stopped state (for example, in a case where the PWM signal is at low level).

Similarly to the light-emitting diode lighting system 100, the light-emitting diode lighting system 120 is a circuit in which anode-side ends of the LED arrays 1011 and 1012 are connected to an identical point, and two LED systems are to be turned on. Note, however, that the light-emitting diode lighting system 120 is capable of controlling colors of light by controlling brightness of the LED systems.

Similarly to the lighting circuit 101 shown in FIG. 1, the lighting circuit 121 causes the LED array 1011, which is constituted by LEDs 1 which emit white light, to be turned on in accordance with control carried out by the constant current circuit 24.

The constant current circuit 24 is different from the constant current circuit 1003 shown in FIG. 1 in that it includes the PWM wave generating circuit 29. The PWM wave generating circuit 29 generates a PWM signal whose pulse widths at a high level and whose pulse widths at a low level can be set, and supplies the PWM signal to the operational amplifier 26.

The operational amplifier 26 (i) carries out usual constant current driving while the PWM signal is at a high level and (ii) causes the transistor 1006 to be open so as to prevent a current from passing through the constant current circuit 24 while the PWM signal is at a low level.

Accordingly, the LED array 1011 is turned on while the PWM signal is at a high level and is turned off while the PWM signal is at a low level. In a case where the LEDs 1 are turned on and off at a high frequency according to logic of the PWM signal (in the light-emitting diode lighting system 120 in FIG. 2, the frequency falls within a range from 200 Hz to 1 kHz), blinking of the LEDs 1 is not perceptible to the human eye, and is perceived as a changed brightness of the LEDs 1.

Similarly to the lighting circuit 102 of FIG. 1, the lighting circuit 122 causes the LED array 1012, constituted by the LEDs 2 which emit warm-color light, to be turned on in accordance with control carried out by the constant current control circuit 23.

The constant current control circuit 23 is different from the constant current control circuit 3 of FIG. 1 in that it includes the PWM wave generating circuit 28 instead of the pulse wave generating circuit 8. The PWM wave generating circuit 28 not only generates pulses like the pulse wave generating circuit 8 of FIG. 1, but also repeats, in a constant cycle, (i) a period during which a pulse signal is generated (hereinafter referred to as a "PWMH period") and (ii) a period during which no pulse signal is generated (hereinafter referred to as a "PWML period").

In the PWMH period, the LED array 1012 is turned on in the same manner as in FIG. 1. On the other hand, in the PWML period, the LED array 1012 is turned off because the transistor 1006 is kept open.

In this configuration, in a case where the PWMH period and the PWML period are repeated at a high frequency (in the light-emitting diode lighting system 120 in FIG. 2, the frequency falls within a range from 200 Hz to 1 kHz), blinking of the LEDs 2 is not perceptible to the human eye, and is perceived as a changed brightness of the LEDs 2.

As has been described, a period during which the LED array 1011 is ON and a period during which the LED array 1012 is ON can be controlled by the PWM wave generating circuits 29 and 28, respectively. Such a control makes it possible to control color of light.

For example, assume that only the LED array 1011 is ON and white light is being emitted. The LED array 1011 is dimmed while warm-color light from the LED array 1012 is gradually added. This makes it possible for the light-emitting diode lighting system 120 to carry out color setting such that for example neutral white gradually changes to warm white.

Embodiment 3

Figure 3:
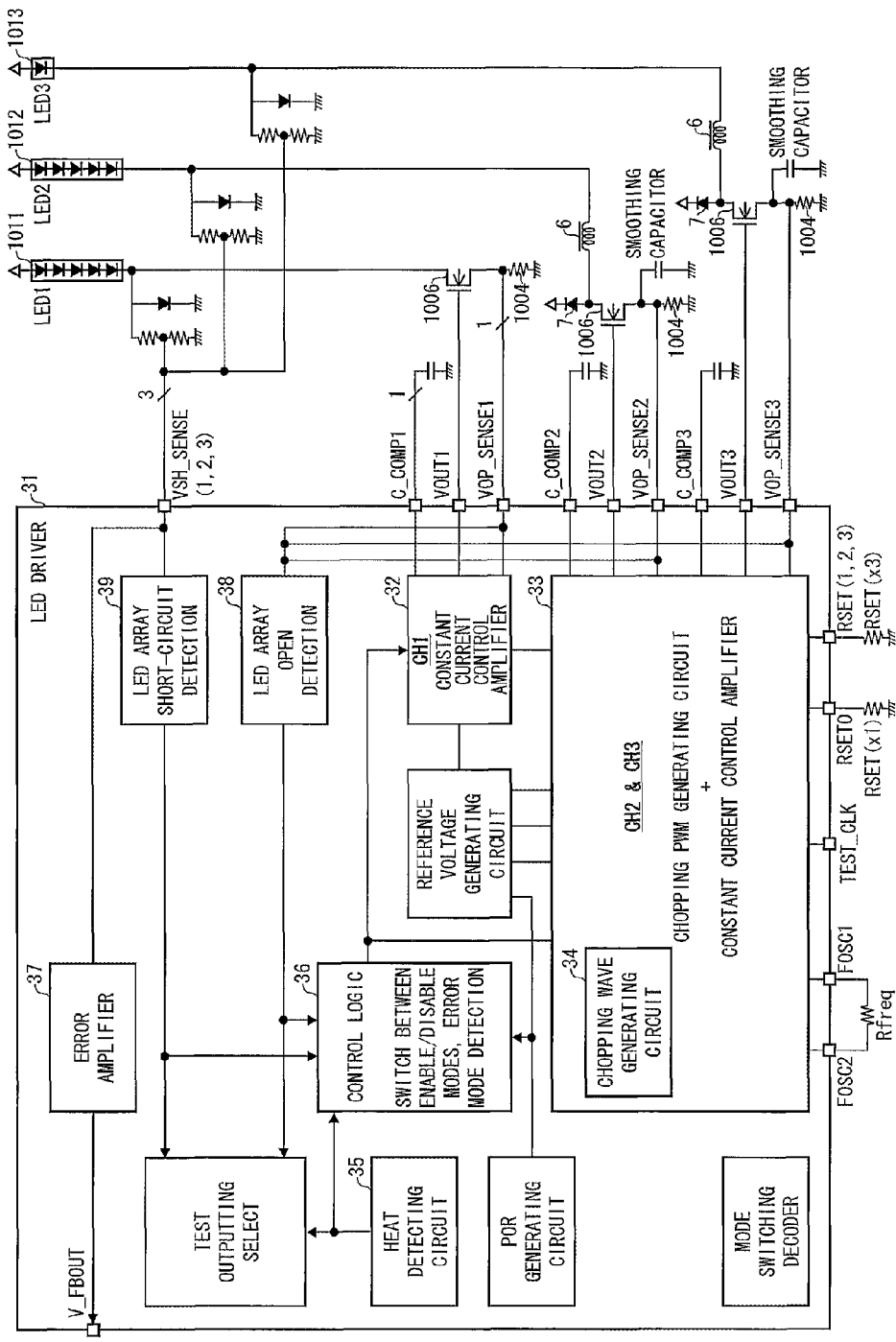
FIG. 3 is a circuit block diagram showing a detailed configuration of an illumination device, which includes an integrated circuit for an illumination device in accordance with an embodiment of the present invention.

FIG. 3 is a circuit block diagram showing a configuration of a light-emitting diode lighting system (illumination device) which includes an LED driver (integrated circuit for illumination device) 31 in accordance with the present embodiment.

In other words, FIG. 3 shows an example of a configuration of an LED illumination device which (i) employs an LED driver IC (integrated circuit) including three constant current circuits (constant current control circuits) for turning on three light-emitting diode systems and (ii) is thereby capable of controlling colors of light from the three light-emitting diode systems.

The LED driver 31 is an integrated circuit which includes (i) one circuit (CH1: a first system), i.e., a constant current control amplifier (first constant current driving circuit) 32 for turning on LEDs and (ii) two circuits (CH2: a second system, CH3: a third system), i.e., two sets of chopping PWM generating circuit+constant current control amplifier (second constant current driving circuit) 33 for turning on LEDs. Note that, in the following descriptions, for convenience of description, the chopping PWM generating circuit+constant current control amplifier 33 is simply referred to as a circuit 33.

A terminal VOUT 1 (first terminal) is an output terminal of the constant current control amplifier 32 which is the CH1. A terminal VOP_SENSE 1 (second terminal) is an input terminal of the CH1, which is for receiving an open state detection signal. A terminal VOUT 2 (third terminal) is an output terminal of the CH2 of the circuit 33. A terminal VOP_SENSE 2 (forth terminal) is an input terminal of the CH2, which is for receiving an open state detection signal. A terminal VOUT 3 is an output terminal of the CH3 of the circuit 33. A terminal VOP_SENSE 3 is an input terminal of the CH3, which is for receiving an open state detection signal.

As shown in FIG. 3, in the same manner as in FIG. 2, a gate of a transistor (first transistor) 1006 is connected to the terminal VOUT1, and a resistor (first resistor) 1004, which is a sense resistor, is provided between a source of the transistor 1006 and a GND (second power supply line). In this configuration, by connecting the terminal VOP_SENSE1 with a point at which the source of the transistor 1006 and the resistor 1004 are connected to each other, it is possible to cause a constant current to be supplied to the LED array 1011 (CH1). The same applies to in the CH2 and the CH3.

In a case where (i) the same voltage is applied to anodes of light-emitting diode systems and (ii) the light-emitting diode systems having different forward voltage drops (Vf) are connected to the CH1 and the CH2, respectively, heat generation would occur. For the purpose of dealing with such heat generation, the chopping PWM generating circuit is contained in the CH2 of the circuit 33. This enables the LED driver 31 alone to control colors of light. The chopping PWM generating circuit operates in the same manner as the PWM generating circuit 28, which is included in the light-emitting diode lighting system 120 described with reference to FIG. 2.

The LED driver 31 includes an extra set of "chopping PWM generating circuit+constant current control amplifier" (CH3) for turning on LEDs, as compared to the light-emitting diode lighting system 120 (see FIG. 2). The LED driver 31 can be used such that (i) the CH1 and CH2 are used to carry out control of usual lighting whereas (ii) the CH3 is used to control lighting of all-night LEDs.

The LED arrays 1011 and 1012 and one LED 3 (for convenience of description, the LED 3 is assigned a reference numeral 1013) are driven by electric currents whose values are set by sense resistors, i.e., the resistors 1004, which are connected to the respective terminals VOP_SENSE 1 to VOP_SENSE 3. The constant current control amplifier 32 and the circuit 33 control their output so that voltages of the respective terminals VOP_SENSE 1 to VOP_SENSE 3, which voltages are generated when LED driving currents passes through the respective resistors 1004, are each a predetermined voltage level of 200 mV.

The predetermined voltage level is determined by a resistance value of a resistor RSET (×1) and a resistance value of a resistor RSET (×3). The resistor RSET (×1) is connected to a terminal RSET0, and the resistor RSET (×3) is connected to a terminal RSET1 to RSET3. Assuming that the resistor RSET (×1) of the terminal RSET0 is 625Ω and the resistor RSET (×3) of the terminal RSET1 to RSET3 (in FIG. 3, represented as "RSET (1, 2, 3)") is 10Ω, the predetermined voltage level is represented by the following equation. Note that the resistance values below are examples, and can be any values provided that the following equation holds.

The predetermined voltage level at each of the terminals $$\text{VOP\_SENSE1 to VOP\_SENSE3} = \text{reference current} \times$$
$$\frac{RSET1 \text{ to } RSET3 \ (10 \ \Omega)}{}$$
$$= (1.25 \ V \ / \ RSET0 \ (625 \ \Omega)) \times$$
$$RSET1 \text{ to } RSET3 \ (10 \ \Omega)$$
$$= 200 \ mV$$

Furthermore, chopping frequencies of the CH2 and CH3 are generated by a chopping wave generating circuit 34, which is an oscillator circuit contained in the circuit 33. The chopping wave generating circuit 34 supports frequencies ranging from 150 kHz to 300 kHz. The frequencies can be changed by a resistor Rfreq connected between terminals FOSC1 and FOSC2.

The constant current control amplifier 32 and the circuit 33 each have a PWM_IN input terminal (not shown), and thus are capable of separately receiving, from outside, a PWM light control signal obtained by pulse width modulation. With this function, the constant current control amplifier 32 and the circuit 33 carry out pulse driving of the transistors 1006, which are connected to the cathode-side ends of the respective LED arrays 1011 and 1012 each of which is constituted by LEDs connected in series and to a cathode of the LED 1013. As a result, the constant current control amplifier 32 and the circuit 33 are capable of controlling light emitted from their corresponding LED arrays 1011 and 1012 and the LED 1013, without changing current values. The LED driver 31 supports PWM light control signals having the following properties.

Range of frequencies of PWM light control: 200 Hz to 1 kHz

PWM On duty: 1.0% to 100%

Furthermore, the LED driver 31 has the following error detection and protection functions: (i) a thermal error detecting function, (ii) a function of detecting an open state of each light-emitting diode system and (iii) a function of detecting a short-circuit in each light-emitting diode system.

The thermal error detecting function includes the following function. That is, if a heat detecting circuit 35 in the LED driver 31 detects a state in which temperature reached 125° C. (typ.), a control logic 36 determines that the state is a thermal error state and turns off all current drivers. The thermal error detecting function also includes the following function. That is, if the control logic 36 has determined that the detected state is the thermal error state, the thermal error detecting function causes an output voltage V_FBOUT of an error amplifier 37 to be 0 V. Note that, when the temperature in the LED driver 31 has decreased to 80° C., all the current drivers and the error amplifier 37 automatically return to normal operation.

The function of detecting the open state of each light-emitting diode system works in a case where a voltage inputted to at least one of the terminals VOP_SENSE1 to VOP_SENSE3 is below a certain voltage while the constant current control amplifier 32 and the circuit 33 are in operation (a state in which LEDs are ON). Note that, in the present embodiment, the certain voltage is for example, 100 mV (typ.). In such a case, a reduction in the voltage is detected by an LED array open detecting circuit (open detecting circuit) 38. The LED array open detecting circuit 38 determines that a light-emitting diode system is in an open state when it has detected a reduction in the voltage, and informs the control logic 36 of detection of an error. When the control logic 36 has detected an open state of the CH1 (LED array 1011), the control logic 36 turns off constant current drivers of all the CHs and turns off also the error amplifier 37. Furthermore, when the control logic 36 has detected the open state of the CH2 (LED array 1012) or the CH3 (LED 3), the control logic 36 turns off only a constant current driver of a CH that is in the open state, and keeps the error amplifier 37 in an ON state (keep output).

The function of detecting a short-circuit in each light-emitting diode system works in a case where a voltage inputted to a terminal VSH_SENSE (1, 2, 3) is greater than a certain voltage while the constant current control amplifier 32 and the circuit 33 are in operation (a state in which LEDs are ON). Note that, in the present embodiment, for example, the certain voltage is set at 3.25 V (typ.). In such a case, an increase in voltage is detected by an LED array short-circuit detecting circuit (short-circuit detecting circuit) 39. The LED array short-circuit detecting circuit 39 determines that a short circuit has occurred in a light-emitting diode system when it has detected the increase in voltage, and informs the control logic 36 that an error has been detected. Upon being informed that the short circuit has been detected, the control logic 36 turns off constant current drivers of all the CHs and also turns off the error amplifier 37.

Note that the LED driver 31 can have a configuration which includes only the LED array open detecting circuit 38 or only the LED array short-circuit detecting circuit 39.

An output voltage V_FBOUT is an output voltage of the error amplifier 37, whose input terminal is the terminal VSH_SENSE (1, 2, 3). The output voltage V_FBOUT is for carrying out feedback control on an external DC/DC converter (not illustrated). The terminal VSH_SENSE (1, 2, 3) receives a voltage generated by dividing an anode voltage supplied from the external DC/DC converter (in the present embodiment, the voltages is set at 2 V). The error amplifier receives the voltage via the terminal VSH_SENSE (1, 2, 3), and outputs a received voltage as the output voltage V_FBOUT. This allows the external DC/DC converter to carry out control by utilizing this voltage value as a feedback value. Further, in a case where the error detection and protection functions become active and have detected an anomaly in the LED driver 31 as described above, the external DC/DC converter detects a state in which the output voltage V_FBOUT (output from the error amplifier 37) is zero, and carries out control so as to stop generation of the anode voltage to be applied to each light-emitting diode system.

As has been described, the LED driver 31 is for driving a light-emitting diode group which includes at least the LED arrays 1011 and 1012, (i) whose anode-side ends are connected to an identical point and (ii) which have different emission wavelengths.

The LED driver 31 includes the constant current control amplifier 32 and the circuit 33. The constant current control amplifier 32 drives the LED array 1011 by a steady electric current. The circuit 33 drives the LED array 1012 by an intermittent current and a regenerative current. Furthermore, the constant current control amplifier 32 and the circuit 33 are capable of easily controlling brightness of light-emitting diodes which constitute the LED arrays 1011 and 1012, by controlling periods during which their corresponding light-emitting diodes are ON.

By applying the LED driver 31 to the light-emitting diode lighting system 120 (or the light-emitting diode lighting system 100) which includes a plurality of light-emitting diode lighting systems, it is possible to realize a light-emitting diode system capable of reducing heat generation at low cost.

In a case where the LED driver 31 is applied to the light-emitting diode lighting system 100, the LED driver 31 and the light-emitting diode lighting system 100 can be arranged such that (i) the constant current control amplifier 32 corresponds to the comparator 1005 and (ii) the circuit 33 corresponds to the operational amplifier 5 and the pulse wave generating circuit 8. In a case where the LED driver 31 is applied to the light-emitting diode lighting system 120, the LED driver 31 and the light-emitting diode lighting system 120 can be arranged such that (i) the constant current control amplifier 32 corresponds to the operational amplifier 26 and (ii) the circuit 33 corresponds to the operational amplifier 25 and the PWM wave generating circuits 28 and 29.

It is preferable that an integrated circuit for an illumination device of the present invention is configured such that a power a power MOSFET and a resistor, which are provided outside the integrated circuit, are connectable to the first constant current driving circuit; and a power MOSFET, a resistor, an inductance and a diode, which are provided outside the integrated circuit, are connectable to the second constant current driving circuit.

Furthermore, the integrated circuit for the illumination device of the present invention further includes a short-circuit detecting circuit for detecting a short-circuit in each of the first and second light-emitting diode systems.

According to the configuration, the integrated circuit is capable of detecting a short-circuit in each of the light-emitting diode systems.

Furthermore, the integrated circuit for the illumination device of the present invention further includes an open detecting circuit for detecting an open state of each of the first and second light-emitting diode systems.

According to the configuration, the integrated circuit is capable of detecting an open state of each of the light-emitting diode systems.

The present invention is not limited to the descriptions of the respective embodiments, but may be altered within the scope of the claims. An embodiment derived from a proper combination of technical means disclosed in different embodiments is also encompassed in the technical scope of the invention.

INDUSTRIAL APPLICABILITY

The present invention is applicable to an illumination device and an integrated circuit for an illumination device, in each of which (i) aggregate of a plurality of light-emitting elements such as LEDs constitutes a single light source and (ii) the light source is used as an illumination lamp whose brightness can be controlled to a desired brightness.

REFERENCE SIGNS LIST

3 Constant current control circuit (second constant current driving circuit)
5 Operational amplifier (second amplifier)
6 Coil (inductance)
7 Diode (freewheel diode)
8 Pulse wave generating circuit
25 Operational amplifier (second amplifier)
26 Operational amplifier (first amplifier)
28 PWM wave generating circuit (pulse wave generating circuit)
31 LED driver (integrated circuit for illumination device)
32 Constant current control amplifier (first constant current driving circuit)
33 Chopping PWM generating circuit+constant current control amplifier (second constant current driving circuit)
38 LED array open detecting circuit (open detecting circuit)
39 LED array short-circuit detecting circuit (short-circuit detecting circuit)
100 Light-emitting diode lighting system (illumination device)
120 Light-emitting diode lighting system (illumination device)
1003 Constant current circuit (first constant current driving circuit)
1004 Resistor (first resistor, second resistor)
1005 Comparator (first amplifier)

1006 Transistor (first transistor, second transistor, power MOSFET)
1011 LED array (first light-emitting diode system)
1012 LED array (second light-emitting diode system)

The invention claimed is:

1. An integrated circuit for driving a group of light-emitting diodes,
the group of the light-emitting diodes including at least
a first light-emitting diode system constituted by one light-emitting diode or by a plurality of light-emitting diodes connected in series, and
a second light-emitting diode system constituted by one light-emitting diode or by a plurality of light emitting diodes connected in series,
the one light-emitting diode or the plurality of light-emitting diodes, which constitute(s) the first light-emitting diode system, having a forward voltage drop greater than that of the one light-emitting diode or the plurality of light-emitting diodes which constitute(s) the second light-emitting diode system,
an anode-side end of the first light-emitting diode system and an anode-side end of the second light-emitting diode system being connected to an identical point, and
the one light-emitting diode or the plurality of light-emitting diodes, which constitute(s) the first light-emitting diode system, each having an emission wavelength different from that of each of the one light-emitting diode or the plurality of light-emitting diodes which constitute(s) the second light-emitting diode system,
said integrated circuit, comprising:
a first constant current driving circuit for controlling a current which drives the first light-emitting diode system; and
a second constant current driving circuit for controlling a current which drives the second light-emitting diode system,
the first constant current driving circuit driving the first light-emitting diode system by a steady electric current,
the second constant current driving circuit driving the second light-emitting diode system by an intermittent current and a regenerative current,
the first constant current driving circuit being capable of controlling brightness of the one light-emitting diode or the plurality of light-emitting diodes which constitute(s) the first light-emitting diode system which is to be driven, by controlling a period during which the one light-emitting diode or the plurality of light-emitting diodes which constitute(s) the first light-emitting diode system is/are ON,
the second constant current driving circuit being capable of controlling brightness of the one light-emitting diode or the plurality of light-emitting diodes which constitute(s) the second light-emitting diode system which is to be driven, by controlling a period during which the one light-emitting diode or the plurality of light-emitting diodes which constitute(s) the second light-emitting diode system is/are ON
the second constant current driving circuit including an inductance and a power MOSFET, and
the inductance storing energy while the power MOSFET is operating and releasing the energy while the power MOSFET is open, thereby generating the regenerative current.

2. The integrated circuit according to claim 1, wherein:
the first constant current driving circuit includes a power MOSFET and a resistor, which are provided outside the integrated circuit; and
the second constant current driving circuit includes the power MOSFET, a resistor, the inductance and a diode, which are provided outside the integrated circuit.

3. An integrated circuit according to claim 1, further comprising a short-circuit detecting circuit for detecting a short-circuit in each of the first and second light-emitting diode systems.

4. An integrated circuit according to claim 2, further comprising a short-circuit detecting circuit for detecting a short-circuit in each of the first and second light-emitting diode systems.

5. An integrated circuit according to claim 1, further comprising an open detecting circuit for detecting an open state of each of the first and second light-emitting diode systems.

6. An integrated circuit according to claim 2, further comprising an open detecting circuit for detecting an open state of each of the first and second light-emitting diode systems.

7. An illumination device, comprising:
a first power supply line;
a second power supply line;
a first light-emitting diode system constituted by one light-emitting diode or by a plurality of light-emitting diodes connected in series;
a second light-emitting diode system constituted by one light-emitting diode or by a plurality of light-emitting diodes connected in series;
an inductance which has a first terminal and a second terminal;
a freewheel diode;
a first constant current driving circuit for controlling a current which drives the first light-emitting diode system; and
a second constant current driving circuit for controlling a current which drives the second light-emitting diode system,
the one light-emitting diode or the plurality of light-emitting diodes, which constitute(s) the first light-emitting diode system, having a forward voltage drop greater than that of the one light-emitting diode or the plurality of light-emitting diodes which constitute(s) the second light-emitting diode system,
the first constant current driving circuit including
a first transistor which has a source, a drain and a gate,
a first resistor which has (i) a first terminal connected to the source of the first transistor and (ii) a second terminal connected to the second power supply line, and
a first amplifier (i) which receives, at its input terminals, a voltage value detected at the source of the first transistor and a first reference voltage and (ii) whose output terminal is connected to the gate of the first transistor,
the second constant current driving circuit including
a second transistor which has a source, a drain and a gate,
a second resistor which has (i) a first terminal connected to the source of the second transistor and (ii) a second terminal connected to the second power supply line,
a second amplifier which (i) receives, at its input terminals, a voltage value detected at the source of the second transistor and a second reference voltage and (ii) whose output terminal is connected to the gate of the second transistor, and a pulse wave generating circuit for generating a pulse which controls whether or not to cause the second amplifier to operate and supplying the pulse to the second amplifier, an anode-side end of the first light-emitting diode system, an anode-side end of the second light-emitting diode system, and a cathode of the freewheel diode being connected to the first power supply line, a cathode-side end of the first light-emitting diode system being connected to the drain of the first transistor, a cathode-side end of the second light-emitting diode system being connected to the first terminal of the inductance, the second terminal of the inductance being connected to the drain of the second transistor and an anode of the freewheel diode, the one light-emitting diode or the plurality of light-emitting diodes, which constitute(s) the first light-emitting diode system, each having an emission wavelength different from that of each of the one light-emitting diode or the plurality of light-emitting diodes which constitute(s) the second light-emitting diode system, the first amplifier, the second amplifier and the pulse wave generating circuit being provided on an integrated circuit, and the integrated circuit being capable of
controlling brightness of the one light-emitting diode or the plurality of light-emitting diodes which constitute(s) the first light-emitting diode system, by controlling a period during which the one light-emitting diode or the plurality of light-emitting diodes which constitute(s) the first light-emitting diode system is/are ON, and controlling brightness of the one-light emitting diode or the plurality of light-emitting diodes which constitute(s) the second light-emitting diode system, by controlling a period during which the one light-emitting diode or the plurality of light-emitting diodes which constitute(s) the second light-emitting diode system is/are ON.

\* \* \* \* \*